(12) United States Patent
Aroneo

(10) Patent No.: US 6,493,014 B2
(45) Date of Patent: Dec. 10, 2002

(54) OPTICAL SECURITY DEVICE PRINTING SYSTEM

(75) Inventor: Stephen L. Aroneo, Franklin Lakes, NJ (US)

(73) Assignee: Impress Systems, Billerica, MA (US)

( * ) Notice: Subject to any disclaimer, the term of this patent is extended or adjusted under 35 U.S.C. 154(b) by 0 days.

(21) Appl. No.: 09/748,802

(22) Filed: Dec. 22, 2000

(65) Prior Publication Data

US 2002/0080221 A1 Jun. 27, 2002

(51) Int. Cl.[7] ................................................. B41J 2/325
(52) U.S. Cl. ....................................................... 347/171
(58) Field of Search ................................ 347/171, 224; 156/234

(56) References Cited

U.S. PATENT DOCUMENTS

| | | | |
|---|---|---|---|
| 4,242,565 A | 12/1980 | Schoon | |
| 4,684,795 A | 8/1987 | Colgate, Jr. | |
| 4,728,377 A | 3/1988 | Gallagher | |
| 4,758,296 A | 7/1988 | McGrew | |
| 4,832,445 A | 5/1989 | Haines et al. | |
| 4,833,124 A * | 5/1989 | Lum | 503/227 |
| 5,184,152 A | 2/1993 | French | |
| 5,281,499 A | 1/1994 | Bussard | |
| 5,287,408 A | 2/1994 | Samson | |
| 5,331,443 A | 7/1994 | Stanisci | |
| 5,336,871 A | 8/1994 | Colgate, Jr. | |
| 5,367,148 A | 11/1994 | Storch et al. | |
| 5,447,335 A | 9/1995 | Haslop | |
| 5,464,690 A | 11/1995 | Boswell | |
| 5,665,194 A | 9/1997 | Kay | |
| 5,670,003 A | 9/1997 | Boswell | |
| 5,786,836 A | 7/1998 | Glennon, Jr. | |
| 5,794,532 A | 8/1998 | Gassies et al. | |
| 5,882,463 A * | 3/1999 | Tompkin et al. | 156/234 |
| 6,025,860 A * | 2/2000 | Rosenfeld et al. | 347/171 |
| 6,059,914 A | 5/2000 | Suss | |

FOREIGN PATENT DOCUMENTS

| | | |
|---|---|---|
| GB | 2229963 A | 10/1990 |
| GB | 2250951 A | 6/1992 |
| GB | 2028719 A | 7/1998 |
| WO | WO 9325391 A | 12/1993 |
| WO | WO 98/32594 * | 7/1998 |
| WO | WO 98/33318 | 7/1998 |
| WO | WO 99/12744 * | 3/1999 |

* cited by examiner

*Primary Examiner*—Huan Tran
(74) *Attorney, Agent, or Firm*—Cesari and McKenna, LLP

(57) ABSTRACT

A digital print system for generating and printing selectably shaped shaped optical security devices onto the surface of a substrate, wherein the selected shapes may incorporate a pre-printed pattern. The system includes a digital print engine for generating selectable shapes, a foil assembly that includes a supply of thermal foil optionally carrying a pre-printed optical security pattern, a pressure mechanism for applying pressure between the digital print engine and a surface of the substrate, and an advancing mechanism for co-operatively advancing a substrate, either simultaneously with or independently from the foil, each of which may be operatively controlled by a microprocessor.

30 Claims, 4 Drawing Sheets

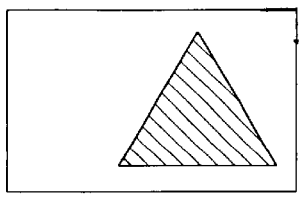
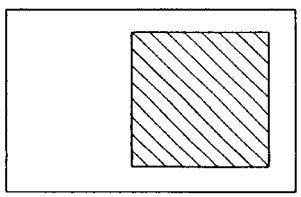
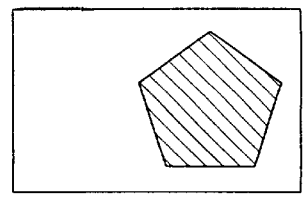
FIG. 7a      FIG. 7b      FIG. 7c
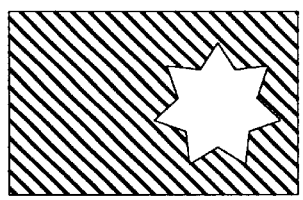
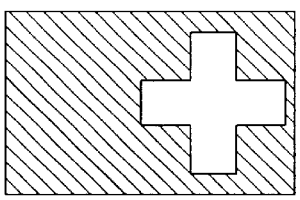
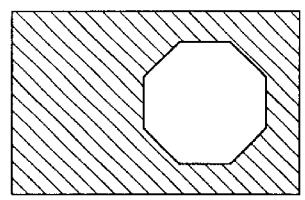
FIG. 8a      FIG. 8b      FIG. 8c
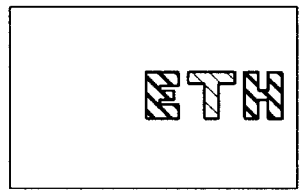
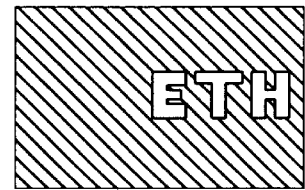
FIG. 9      FIG. 10
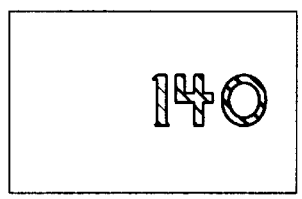
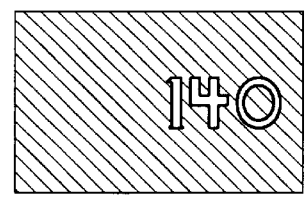
FIG. 11      FIG. 12
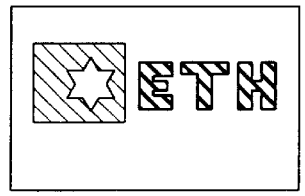
FIG. 13

OPTICAL SECURITY DEVICE PRINTING SYSTEM

BACKGROUND OF THE INVENTION

1. Field of the Invention

The present invention relates to optical security devices, especially those designed for security printing and brand authentication, and more particularly to personalized or serialized optical security devices and the on-demand digital printing and application thereof.

2. Background Information

Optical security devices are useful authentication tools that help to protect against the fraudulent reproduction of the objects or documents to which they are applied. The normally high cost and difficulty in reproducing certain optical security devices makes them well suited for this purpose. For example, images may be designed such that they are nearly impossible to copy, even when using an advanced color photocopying techniques. Additionally, optical security devices can be incorporated in or affixed to a document or object such that their removal will sufficiently alter the image, rendering it unusable. Several types of optical security devices currently exist. Typically, these include holographic images, kinegrams, stereograms, optical variable devices ("OVD's"), images produced from metallic or pigmented foils, and the like.

One type of optical security device used for authentication purposes is the transmission hologram. Typically, transmission holograms are transparent and allow light to pass through from behind to reconstruct the holographic image. Often, however, when a transmission hologram is mounted to the surface of an opaque object a specular metal layer is used as a backing material. Reflected light then bounces off the metal layer and effectively lights the hologram from behind. These embossed or "shiny" holograms are a specific type of transmission hologram, and are the type of hologram typically used for security printing and brand authentication on items such as credit cards and software packaging. An embossed hologram is popular because it may be reproduced relatively quickly and inexpensively in large quantities. This type of hologram is typically provided, in quantity, as part of holographic foil.

A holographic foil commonly carries a series of identical embossed holographic image. The process of creating a holographic foil is fairly standardized. First, a laser light source and optical components are used to create a diffraction light pattern. This pattern is used to expose a film, which creates a photosensitive master. Base shim stock comprised of zinc and or other metals, coated with a photosensitive acid resist like a photo-polymer emulsion, is exposed to a light source through the master. The unactivated resist is then removed through a wash step. Next, the prepared shim is placed in an electroplating bath to add the materials that create the holographic image. Alternatively, the shim may also be created with etching (by removing material) using a photonegative master. Finally, the shim is used to emboss a topcoat (lacquer layer) and/or an aluminum layer prior to applying a sizing coat. The resulting holographic foil is normally used as a hot-stamping foil for foil blocking, where a run of several million copies is not uncommon.

Hot-stamping is a well-established method of transferring premade embossed holographic images to a substrate. Hot-stamping involves using a heated, image-shaped die under pressure to thermally transfer an image from a foil web. The heat and pressure from the die cause a pigment or a metal film to be released from a carrier and the holographic image to be transferred to the substrate. To transfer an image, the die is first heated, typically to between 250°–275° F., and the die is then pressed against the holographic foil, typically with several hundred pounds of pressure, for a dwell time of approximately ½ second. Hot-stamping is adequate for repeatedly transferring the same shaped image to a series of substrates. However, a significant drawback with hot-stamping is that the fabricating of the die is time consuming and relatively expensive. Therefore, creating large quantities of unique or personalized holograms using this method is impractical.

Other types of foils, such as pigmented foils, metallic foils and foils with a high reflective index ("HRI") coating, produce images that are difficult or impossible to photocopy and are thus particularly suited for generating optical security devices. Like the above-described holographic foils, these foils are also traditionally applied using hot-stamping or other similar means, and are therefore not particularly suited for producing on-demand personalized or serialized optical security images.

It is therefore an object of the present invention to provide a method and system for producing and applying individual optical security devices for security printing, brand authentication and other purposes. It is a further object to provide a method and apparatus for producing optical security devices that bear indicia that are uniquely associated with the owner of the item upon which the hologram is placed.

SUMMARY OF THE INVENTION

To accomplish the foregoing and other objects, features and advantages of the present invention I have provided a digitally-controlled thermal printing system that uses a digital print engine to transfer an optical security image from a thermal foil onto a substrate. Digital technology allows each applied image to be personalized or serialized and printed on demand.

The invention makes use of unique thermal foils designed for application by a digital print engine. Particularly, the thermal foils include a film carrier that resists distortion when subjected to the relatively high temperatures and pressures associated with the digital thermal printing process. More specifically, the thermal foils include a back-coating that comes into contact with the print head. The backcoating includes a lubricant that reduces the drag of a thermal print head, thus preventing the thermal foils from sticking to the thermal print head during printing.

The thermal foils used by the inventive system further include a top coat that resists distortion when subjected to the elevated temperatures (approaching 400 degrees F.) associated with the digital transfer process. The thermal foil preferably also includes a fast-acting yet aggressive thermally activated adhesive (size coat) that facilitates image transfer from the foil to a substrate.

Another feature of the inventive system is that the gauge of the film carriers employed by the thermal foils may be significantly thinner than typical hot-stamping foils. Thinner carriers are available because the employed foils do not need the strength or sturdiness required of hot-stamping foils. Thinner carriers allow for better heat transfer and thus quicker dwell times. Thinner carriers also allow for cooler print head temperatures, which helps to protect the foils from crazing. Additionally, thinner carriers allow for increased print speed.

BRIEF DESCRIPTION OF THE DRAWINGS

For a fuller understanding of the nature and objects of the invention, reference should be had to the following detailed description taken in connection with the accompanying drawings, of which:

FIGS. 7a through 7c are examples of variable shaped optical security devices that can be produced in accordance with the present invention;

FIGS. 8a through 8c are examples of variable drop out shaped optical security devices that can be produced in accordance with the present invention;

FIG. 9 is an example of a personalized optical security image that can be produced in accordance with the present invention;

FIG. 10 is an example of a drop out personalized optical security image that can be produced in accordance with the present invention;

FIG. 11 is an example of a serialized optical security image that can be produced in accordance with the present invention;

FIG. 12 is an example of a drop out serialized optical security image that can be produced in accordance with the present invention; and FIG. 13 is an example of a combination of various optical security devices that can be produced in accordance with the present invention.

DETAILED DESCRIPTION OF AN ILLUSTRATIVE EMBODIMENT

Figure 1:
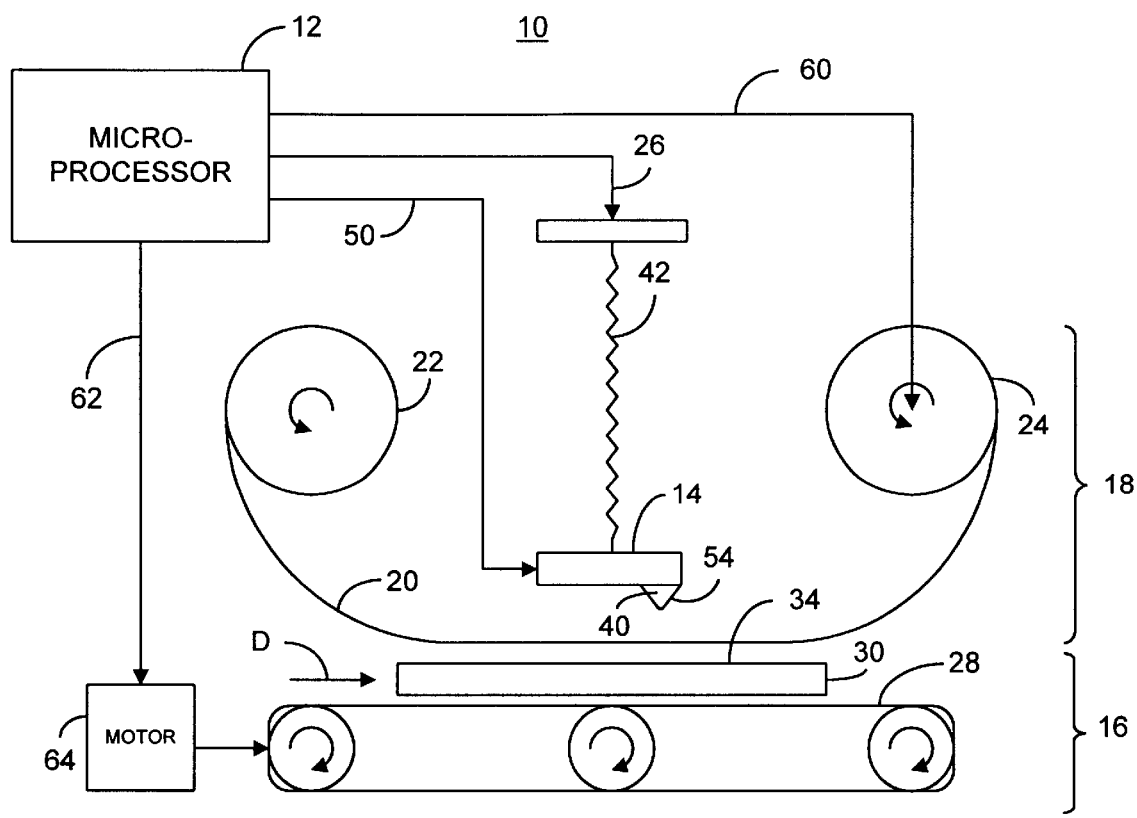
FIG. 1 is a partial diagrammatic side view of a digital print engine employing a thermal print head.

Referring to FIG. 1, a digital print engine 10 includes a microprocessor 12 that drives a thermal print head assembly 14, a drive assembly 16 and a thermal foil assembly 18 in accordance with the present invention. Microprocessor 12 controls the printing process and generates a selected shape to be printed.

Thermal foil assembly 18 includes a supply of thermal foil 20, which is supplied from a supply roll 22 and collected on a take-up roll 24. Preferably, thermal foil 20 carries a pre-embossed optical security pattern that has been impressed on the foil by any of the prior art techniques for embossing a foil with an image. The pre-embossed pattern may be any desired pattern, such as a series of lines extending across or along the foil 20. Although thermal foil 20 is described as carrying a pre-embossed optical security pattern, thermal foil 20 may be metallized, pigmented or clear and may or may not carry a preembossed pattern.

Take-up roll 24 receives control signals on line 60 from microprocessor 12 and is designed to advance thermal foil 20. Drive assembly 16, which is constructed to advance a substrate 30 (e.g., credit cards, identification badges, tickets, etc.) in direction D and into position for printing, includes a motor 64 that receives control signals on line 62 from microprocessor 12. Drive assembly 16 further includes a platform surface 28 for supporting substrate 30.

In the present embodiment, thermal foil 20 and substrate 30 are co-operatively advanced along platform 28 during the printing process while the thermal print head assembly 14 remains stationary. In an alternative embodiment, foil assembly 18 and substrate 30 are held stationary during the printing process while thermal print head assembly 14 is moved across an upper surface 34 of substrate 30. In the alternative embodiment, foil assembly 18 and substrate 30 are preferably co-operatively intermittently advanced to bring successive "frames" of the substrate into position for image transfer.

During the printing process, microprocessor 12 provides control signals on lines 50 and 26 that direct a thermal print head assembly 14, which includes a thermal print head 40 and a pressure mechanism 42 to apply both heat and pressure to thermal foil 20. The combination of heat and downward pressure cause portions of the foil 20 to detach and adhere to the substrate 30.

Figure 2:
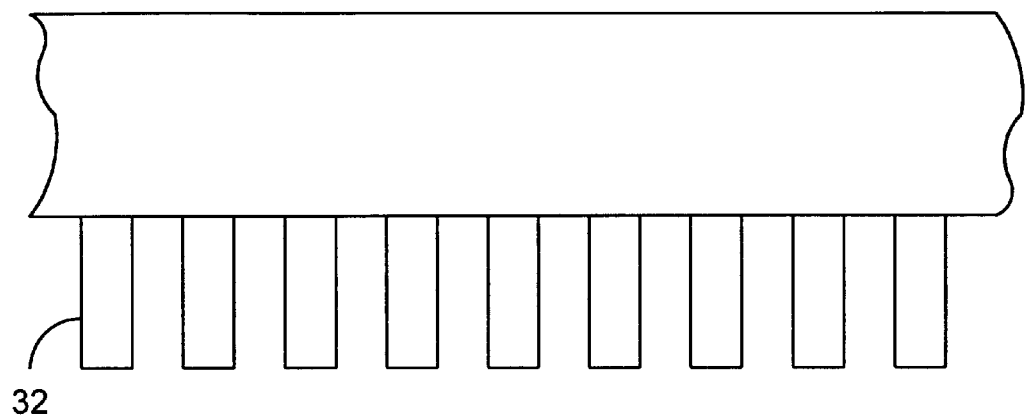
FIG. 2 is a partial diagrammatic front view of the thermal print head of FIG. 1.
Figure 3:
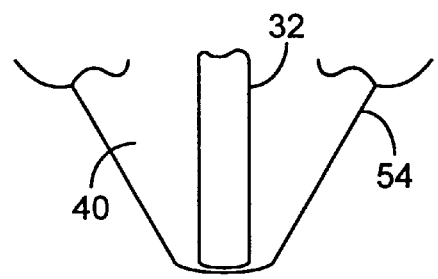
FIG. 3 is a magnified partial view of the thermal print head of FIG. 1.
Figure 4:
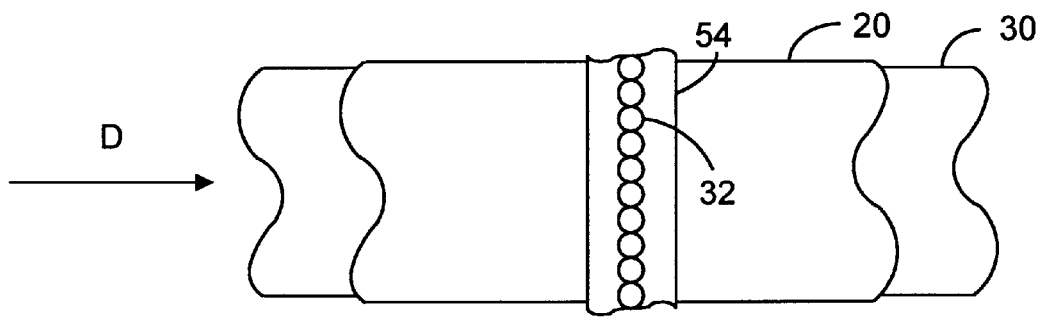
FIG. 4 is a magnified top view of a portion of the thermal print head of FIG. 1.

Referring to FIGS. 2 through 4 print head 40 is preferably a true edge, near edge, or convex type thermal print head that includes a plurality of spaced-apart linearly arranged heating elements 32. The heating elements 32 are shown arrayed perpendicularly to the direction of travel D of substrate 30 and thermal foil 20. Microprocessor 12 provides to print head 40 a plurality of control signals on line 50 that turn on (and off) certain of the individual heating elements 32 needed to produce a desired printed shape.

A print head cover 54, preferably ceramic, covers the heating elements 32 and when the heating elements are turned on efficiently conveys heat from the heating elements 32 to thermal foil 20. When heating elements 32 are turned off, the cover 54 efficiently dissipates the heat to avoid unwanted heat transfer. As substrate 30 is advanced beneath print head, the combination of heat and pressure conveyed from the selectively heated heating elements 32 and the pressure mechanism 42 to thermal foil 20 thermally alters the foil 20, thereby transferring a selected shape to substrate 30 in a line-by-line manner.

Figure 5:
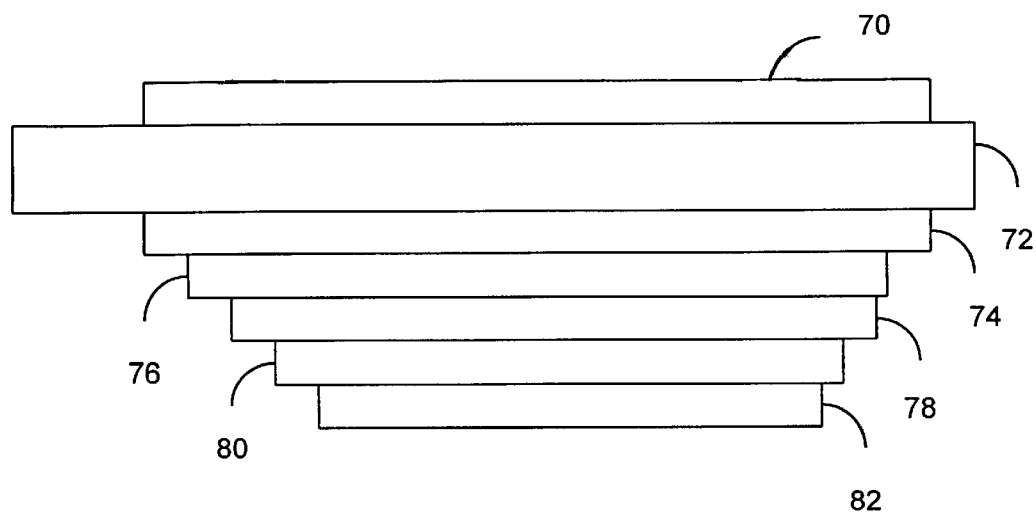
FIG. 5 is a diagrammatic cross-sectional view of a thermal foil according to the present invention.

Referring now to FIG. 5, thermal foil 20 includes a film carrier 72, which preferably does not distort when subjected to the relatively high temperatures and pressures associated with digital thermal printing. The foil 20 further includes a thermally resistive backcoating 70 adhered to the surface of film carrier 72. Backcoating 70 includes a lubricant that reduces the drag of print head 40 as it passes over thermal foil 20, and further includes a filler material that smoothes the surface of film carrier 72. Backcoating 70 may also contain an anti-static agent, which reduces electrostatic discharge between thermal print head 40 and thermal foil 20.

By way of example, thermal foil 20 may include some or all of the following layers attached to film carrier 72; a thermally activated loose yet clean release coat 74 (which may contain wax and or resins), a high temperature top coat 76, an aluminum layer 78 (in metallized foils), a prep coat 80 and a fast-acting yet aggressive thermally activated adhesive 82.

The order in which the layers of thermal foil 20 are applied to film carrier 72 is important. For example, backcoating 70 requires heat curing, and it is thus important to apply the layer as early as possible to the film carrier 72 in the foil manufacturing process. Otherwise, the heat used to cure the backcoating 70 may change the properties of the other layers of thermal foil 20. The release coat 74 and the thermally activated sizing 82 are particularly susceptible to heating and may make the thermal foil 20 flaky or loose.

Preferably, film carrier 72 has a gauge of less than 0.5 mil., but a thicker gauge film may be used. For example, a 0.3 mil. gauge film allows for improved heat transfer between print head 40 and thermal foil 20 and thus allows for quicker dwell times and increased print speeds from digital print engine 10 than thicker gauge films. Additionally, a decrease in the gauge of film carrier 72 allows for cooler print head 40 temperatures because less heat is required to transfer an image from thermal foil 20 to a substrate. Furthermore, lower print head temperatures help protect thermal foil 20 from crazing.

Figure 6:
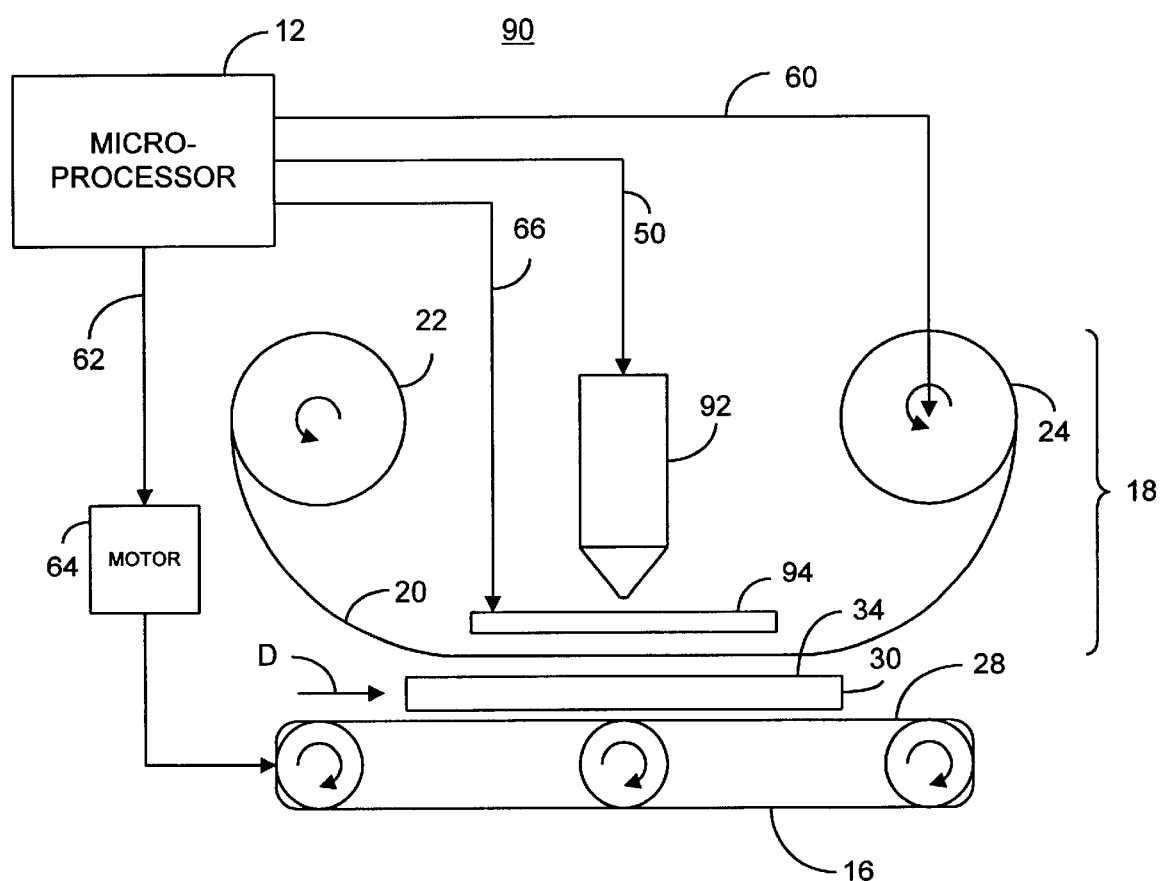
FIG. 6 is a partial diagrammatic side view of a digital print engine employing a laser-based printing device.

Referring now to FIG. 6, an alternative embodiment of the present invention is shown. A digital print engine 90 replaces the thermal print head 40 of FIG. 1 with a laser-based print head 92. Digital print engine 90 further includes an optical plate assembly 94, which is disposed between laser-based print head 92 and thermal foil 20, and is used to apply needed pressure to thermal foil 20. Individual lasers in the print head 92 selectively apply the heat needed to thermally alter thermal foil 20.

Referring now to FIGS. 7–13, several examples of the many various shapes and images that may be created using the present invention are shown. FIGS. 7a through 7c, for example, show various shaped images 100, 102 and 104 respectively, printed on substrate using different shape algorithms. FIGS. 8a through 8c show examples of various "dropped out" shaped images 106, 108 and 110 respectively, wherein the entire surface of substrate 30 is covered with the holographic pattern, except for a selected shaped image. Referring now to FIGS. 9 through 13 various examples of personalized and or serialized shapes are shown that may be produced in accordance with the present invention. Other security shapes (e.g., bar codes) are contemplated but not shown.

The foregoing has been a detailed description of a preferred embodiment of the invention. Various modifications and additions can be made without departing from the spirit and scope of the invention.

What is claimed is:

1. An optical security printing system for on-demand printing of a selected shape onto the surface of a substrate, wherein the printed selected shape operates as an optical security device, comprising:

a digital print engine for selectively generating heat to one or more of a plurality of individually heatable heating elements on a contact surface of the digital print engine the digital print engine selectively heating the heating elements to correspond to respective pixel locations in the selected shape, with the shape being varied between printings to provide a unique optical security feature;

a thermal foil carrying an optical security layer on a carrier film, said thermal foil operatively positioned between the contact surface of the digital print engine and the surface of the substrate;

a pressure mechanism for applying pressure between the contact surface of the digital print engine and the surface of the substrate; and a microprocessor operatively connected to the digital print engine and the pressure mechanism for selectively controlling the selection of the one or more of the heating elements by the digital print engine and the application of pressure by the pressure mechanism.

2. The system as set forth in claim 1 wherein the microprocessor controls the relative pressure between the contact surface of the digital print engine and the surface of the substrate in accordance with the selected shape and any texture on the surface of the substrate.

3. The system as set forth in claim 1 wherein the digital print engine further comprises a thermal print head.

4. The system as set forth in claim 1 further comprising an advancing mechanism to produce relative movement between the surface of the substrate and the contact surface of the print engine.

5. The system as set forth in claim 4 wherein the advancing mechanism is operatively controlled by the microprocessor.

6. The system as set forth in claim 4, wherein the advancing mechanism advances the substrate in cooperation with the thermal foil during printing.

7. The system as set forth in claim 4, wherein the advancing mechanism maintains the substrate in a relatively stationary position during printing.

8. The system as set forth in claim 1 wherein the selected shape is personalized.

9. The system as set forth in claim 1 wherein the selected shape is serialized.

10. The system as set forth in claim 1 wherein the selected shape is drop out personalized.

11. The system as set forth in claim 1 wherein the selected shape is drop out serialized.

12. The system as set forth in claim 1 further comprising a foil assembly for operatively advancing and collecting the thermal foil.

13. The system as set forth in claim 12 wherein the foil assembly is operatively connected to the microprocessor.

14. The optical security printing system as set forth in claim 1 wherein the microprocessor controls the heating and pressure applied to the thermal foil to transfer portions of the optical security layer that correspond to pixels in the selected shape.

15. The optical security printing system as set forth in claim 1 wherein the microprocessor controls the application of heat and pressure to the thermal foil during printing to prevent distortion of the portions of the optical security layer that are transferred to the substrate pixel by pixel.

16. The optical security printing system as set forth in claim 15 wherein the printing takes place on a smooth surface of the substrate.

17. The optical security system as set forth in claim 15 wherein the printing takes place on a textured surface of the substrate with corresponding portions of the ridges on the textured surface filled in with material transferred from the thermal foil.

18. A digital print system for printing a selected shape onto the surface of a substrate, wherein the selected shape incorporates a pre-printed optical security pattern, comprising:

a digital print engine for generating selectable shapes that are varied between printings to provide an optical security feature;

a foil assembly that includes a supply of thermal foil carrying a pre-printed optical security pattern in a holographic layer;

a pressure mechanism for applying pressure between the digital print engine and the surface of the substrate;

an advancing mechanism for advancing an individual or plurality of substrates; and a microprocessor, operatively connected to each of the digital print engine, the foil assembly, the pressure mechanism and the advancing mechanism to control the printing of the selected shape pixel-by-pixel, the selected shape including a portion of the pre-printed optical security pattern.

19. The system as set forth in claim 18 wherein the digital print engine further comprises a thermal print head.

20. The system as set forth in claim 18 wherein the digital print engine further comprises a laser based print head.

21. The system as set forth in claim 18 wherein the selected shape is personalized.

22. The system as set forth in claim 18 wherein the selected shape is serialized.

23. The system as set forth in claim 18 wherein the selected shape is drop out personalized.

24. The system as set forth in claim 18 wherein the selected shape is drop out serialized.

25. The system as set forth in claim 18 wherein the selected shape is a random or controlled variable pattern.

26. The system as set forth in claim 25 wherein the selected shape is one or more of a set of selected shapes including a social security number, an account number and an identification number.

27. The system as set forth in claim 26 wherein the selected shape is generated using an algorithm.

28. The system as set forth in claim 18 wherein the selected shape is a bar code.

29. A method for transferring a selected shape onto the surface of a substrate, the method including the steps of:
providing a thermal foil that includes a pre-printed optical security pattern on a holographic layer that is supported by a carrier film;
bringing the surface of the substrate into contact with a first surface of the thermal foil;
applying heat and pressure to a second surface of the thermal foil using a digital print engine to cause selected portions of the thermal foil that correspond to pixel locations in the selected shape to adhere to the surface of the substrate to produce a selected holographic shape that includes the pattern, the selected shape being varied between printings to provide an optical security feature.

30. An optical security printing system for on-demand printing of a selected holographic shape onto the surface of a substrate, wherein the printed selected shape operates as an optical security device, the system including:
a digital print engine with one or more individually operable lasers and an optical plate assembly that provides a contact surface, the digital print engine selectively operating the one or more lasers to heat locations that correspond to the locations of respective pixels in the selected shape, with the shape being varied between printings to provide an optical security feature;
a thermal foil carrying a holographic layer on a carrier film, the thermal foil being operatively positioned between the contact surface of the digital print engine and the surface of the substrate;
a pressure mechanism for applying pressure between the contact surface of the digital print engine and the surface of the substrate; and
a microprocessor operatively connected to the digital print engine and the pressure mechanism for selectively controlling the operations of the digital print engine and the pressure mechanism in accordance with the selected shape, so as to print the selected shape pixel-by-pixel as a hologram on the substrate using the thermal foil.

* * * * *